Patented Dec. 5, 1922.

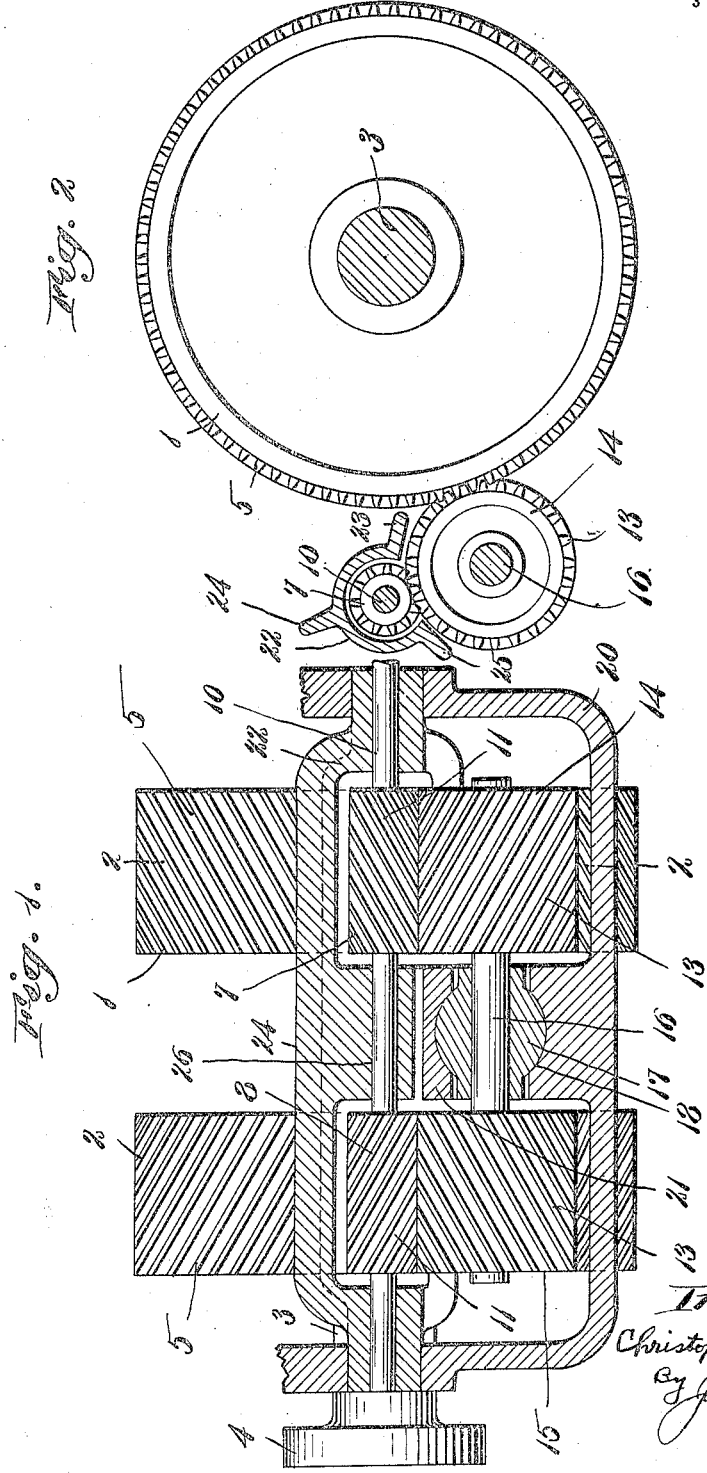

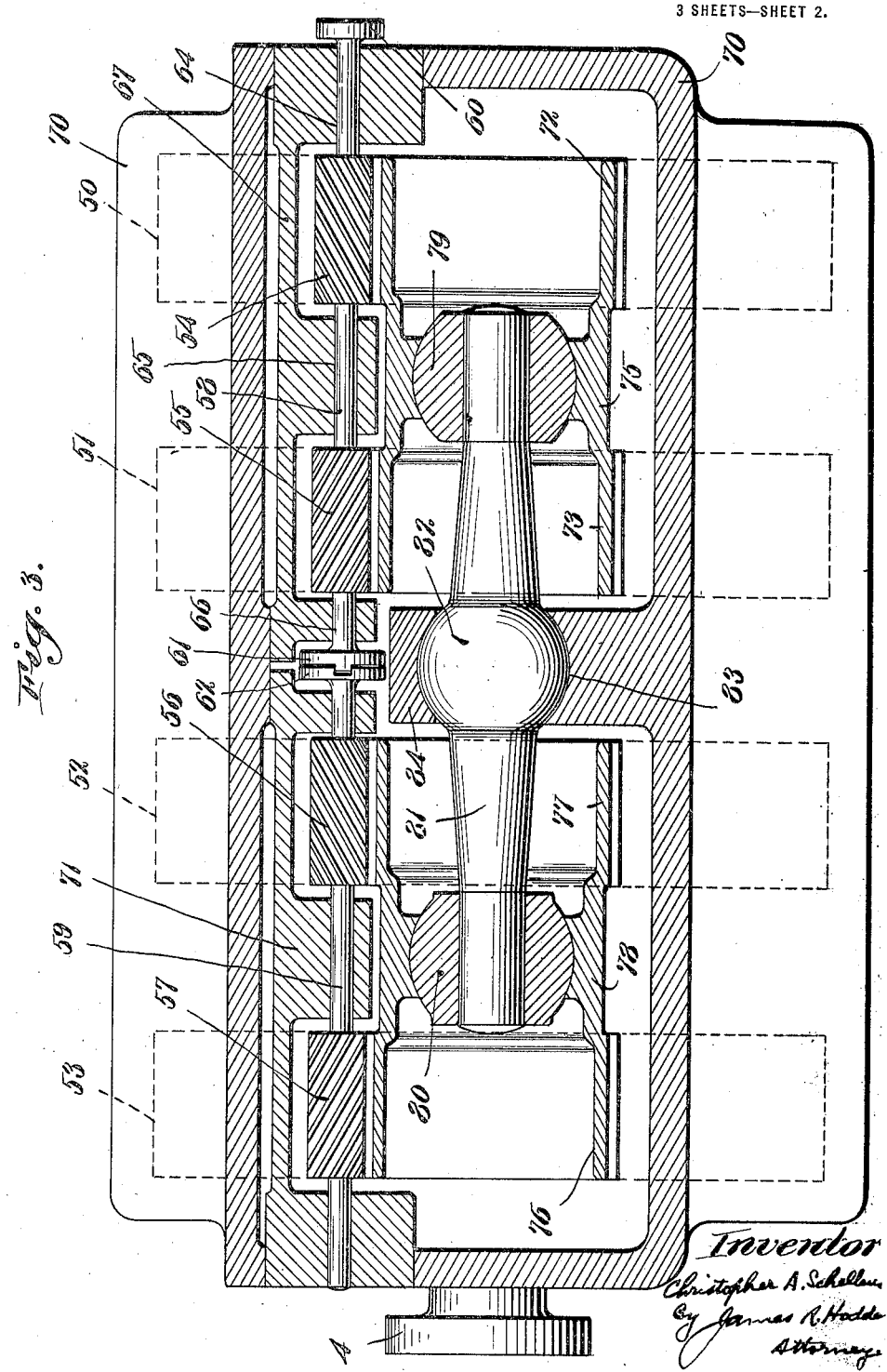

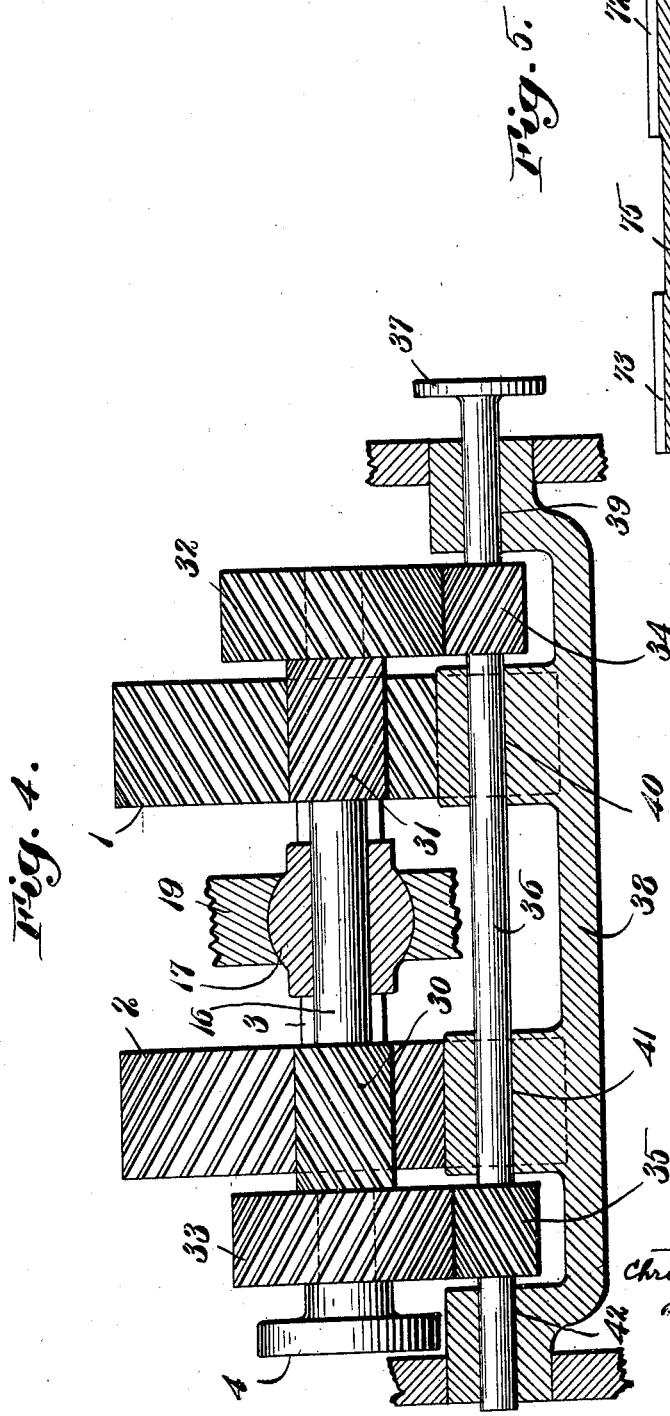

1,437,913

UNITED STATES PATENT OFFICE.

CHRISTOPHER A. SCHELLENS, OF MARBLEHEAD, MASSACHUSETTS.

REDUCTION GEARING.

Application filed June 24, 1918. Serial No. 241,474.

*To all whom it may concern:*

Be it known that I, CHRISTOPHER A. SCHELLENS, a citizen of the United States, and resident of Marblehead, in the county of Essex and State of Massachusetts, have invented an Improvement in Reduction Gearing, of which the following description, in connection with the accompanying drawings, is a specification, like letters on the drawings representing like parts.

My present invention relates to reduction gearing, particularly where high speeds and heavy loads are involved, as in the transmission of turbine driven vessels, and the object of the invention is to improve and perfect such turbine gearing. It will be appreciated that in turbine driven vessels it is essential that the driving element receiving its movement from the turbine engine, must be driven at a relatively high rate of speed for efficiency, whereas the driven element, i. e., the propeller shaft, must be rotated at a greatly reduced rate of speed for its efficiency. The power transmission mechanism between the high speed driving element and the low speed driven element requires capability to transform the power from the high to the low speed maintaining a sufficient reserve of strength and freedom from wear in the teeth of the gearing.

Heretofore the usual construction of reduction gearing for this purpose has simply constituted a set of gears and pinions of appropriate size to secure the reduced speed from the driving to the driven element, but without any suitable provision for taking care of the torsion twist and strains, as well as the actual distortion in such gearing, due to the immense power transmitted. Consequently all such prior reduction gearings, so far as I am aware, involve geared connections directly from the driving pinion to a driven gear and without provision to automatically compensate for distortion in the gearing itself. Such prior constructions, therefore, resulted in unsatisfactory wear, involving great strain and binding between the teeth of the gearing. Furthermore, as it was usually necessary to have a plurality of driving gears or pinions and gears, in order to secure the strength necessary to transmit the power and carry the loads, an additional difficulty was presented in the varying distortion between the gears of successive pairs of toothed members.

My present invention obviates the difficulties above briefly outlined, and provides mechanism enabling an automatic adjustment or self-seating between the toothed members of the gears, thereby eliminating the misadjustment due to torsion in the pinion and strains in the frame and insuring a practically uniform distribution of pressure on the teeth in contact.

I have discovered that by driving from a pinion to a gear through an idler, that I can so mount the idler as to be automatically adjustable for distortion due to twisting of the pinion, as well as provide for other disalinement of the pinion shaft with the gear shaft. To this end, I provide a mounting for the idler which will allow it to adapt itself on the one hand to the toothed members of the pinion and on the other to the toothed members of the gear, distributing the tooth pressures uniformly. Furthermore in applying my invention to a plurality of pairs of driving pinions and gears, I can provide a balanced or compensated construction, by means of my intermediate flexibly mounted idler, and this constitutes an important feature of the invention.

By utilizing such an idler, and a mounting such as referred to therefor, I can drive through the rim of the idler, as distinguished from driving through the axle or shaft carrying the idler, so that any device which will hold the idler properly in mesh between the pinion and the gear and which will permit the idler to seat itself in such position between said idler and gear as to allow for torsional strains in the pinion, disalinement of mountings, or other distortion, will carry out my present invention. In practice it is customary to utilize a pair of driving members substantially at opposite sides of the driven member, this method being well known. To this end I may employ a mounting for the idler which will permit angular movement of the idler axis in any plane passing through it and a sliding movement of the axis along itself but which will restrict the motion so that the idler axis shall always pass through a fixed point in the frame. When embodying the invention in a reduction gearing comprising a pair of pinions and a corresponding pair of gears, I would mount the intermediate pair of idlers on a shaft having a ball seat or other holding device permitting each idler an angular movement of its axis in any plane passing through it and a sliding movement of the axis along itself. This will allow the idler rim or rims to oscillate, twist, or move to take up the torsion and other distortion between the pinion and the gear.

A still further feature of the invention enables me to employ the idler itself as a reduction gearing, thus obtaining the further variation between high speed of the driving element and the lower speed of the driven element, by the variation in diameters of the idler driving element. It will be seen that in all the forms of construction described above both the pinion and the gear shafts are journaled in rigidly supported bearings so that they can readily be coupled to the turbine and propeller shaft respectively, without any reactions due to these couplings being transmitted to the teeth, all of the adjustment for misalinement between pinion and gear is done by the idler or intermediate member or members where a pair for each driven shaft is employed, which does not drive through its shaft and is not coupled to any other member. This constitutes one of the fundamental features of my invention. I believe that the provision of a freely movable idler to compensate for distortions in a reduction gearing of the kind herein described, is distinctly new, as well as a balanced construction, as is also the utilization of such an idler as a further reduction means and I wish to claim these features broadly.

Further details of the invention, novel combinations of parts and advantages will be herein after more fully pointed out and claimed.

Referring to the drawings illustrating pre-preferred embodiments of my invention, Fig. 1 is a side view, partly in section of a simple form of reduction gearing utilizing my invention;

Fig. 2 is a cross-sectional view on the line 2—2 of Fig. 1;

Fig. 3 illustrates a modification, showing in cross-sectional view a plurality of pairs with my novel form of independently movable driving idler;

Fig. 4 is a side view, partly in cross-section, of a reduction gearing with idler wherein the idler element itself is utilized as a further reduction means; and Fig. 5 is a cross-sectional view of a modified form of flexible mounting for the idler.

Referring to the drawings I have shown in Figs. 1 and 2, in diagrammatic form, a construction illustrating my invention wherein 1 and 2 indicate a pair of gear wheels attached to the driven element or propeller shaft 3 to one end of which is a usual coupling 4 to which the shaft sections are secured in any wellknown manner. Preferably the teeth 5, 5 in these gears 1 and 2 are formed at an angle as in the usual balanced herringbone construction. The driving element consisting in the pinions 7 and 8 mounted on the driving shaft 10 connected with the source of power, i. e. turbine engine. The pinions 7 and 8 are positioned and arranged to have the teeth 11, 11 thereon in mesh with the teeth 13, 13 of idlers 14 and 15, said idlers in turn having their teeth in mesh with the teeth 5, 5 in the adjacent gears 1 and 2 respectively. As shown in the drawings the teeth on the idlers, and on the pinions and gears are inclined in corresponding and opposite directions to balance the thrust, as far as possible. The idlers 14 and 15 are mounted on a shaft 16, which in turn is held in a pivotal bearing 17, herein illustrated as a spherical member, mounted in a corresponding spherical support shown in Fig. 1 at 18 and in Fig. 4 at 19. It will be appreciated that in practice it is sometimes desirable to provide a pair of such driving pinions and idlers at each side of the gears 1 and 2, therefore a duplicate pair of pinions and idlers would be positioned on the opposite sides of the gears 1 and 2 in some constructions, but as the same would be duplicates in every respect so far as the mechanical portion and construction is concerned, I have illustrated herein one set only.

Any suitable support, casing or bearing may be employed, as shown in Fig. 1, a frame-work 20 is provided partially or wholly encircling the idlers 14 and 15 and having a central bearing portion for recess 18 thereon between said idlers with a corresponding cap 21 and with branch frames or webs to the bearings for the shaft 3 and also to the frame 22 carrying bearings for the pinion shaft 10. I prefer to form a separate frame 22 for the pinion shaft with a plurality of longitudinal reinforcing webs 23, 24, and 25 carrying also a central bearing for the shaft 10 at 26, so that the three pinion bearings will remain in alinement while the rest of the frame may be subjected to distortions. This construction firmly holds the set of gears, i. e., the pinion, idler and driven gears in mesh, while the flexible support for the idlers permits the latter to automatically settle or seat the teeth thereof in the pinion and gear teeth, compensating and automatically following the torsion, or distortions due to driving strains, loads or temperature changes. By means of this flexibly supporting idler construction, the power transmitted from the driving element to the driven element is thus delivered through the rim or tooth carrying portion of the idlers (as distinguished from through its axle), the axle of the idlers in the form shown in Figs. 1 and 2 being simply for supporting means and to hold the idlers in mesh with the driving pinions and driven gears. Thus my invention avoids the difficulty heretofore found in the construction of reduction gearings of this kind which was principally in obtaining uniform contact of the teeth along the whole pinion due to first, strains in the frame or casing caused by unequal temperature expansions and by laboring and distortion of the vessel, and second to the distortion of the pinion itself caused by the twisting stress to which it is subjected in the transmission of its power. In this way the pressure on the teeth tends to become concentrated on the ends of the two halves of the pinion (assuming the double helical type of construction and to rupture the teeth at this point.

So far as I am aware three methods have formerly been employed to counteract this tendency. In the first method the pinion is made so large in diameter that its twisting distortion is negligible, and the oil film in the journals of the gear and pinion is relied upon to allow the pinion and gear to aline themselves when the frame is in any way distorted. The difficulty here lies in the fact that for the large reduction ratio usually demanded a very large gear would be required. Moreover the adjustment which can be effected by a change in the thickness of the oil film is limited to an extremely small amount. In the second method the pinion is so mounted that its axis is adjustable transversely and the teeth are thereby maintained in contact along the whole length of the pinion. Now since the turbine shaft to which the pinion has to be coupled has its axis rigidly fixed, the pinion and turbine must be connected by a flexible coupling. As is well known, it has so far not been possible to construct flexible couplings suitable for the high speeds demanded in turbines which are free from transverse forces acting on the shafts to be coupled. These forces are taken up by the teeth in contact and disturb the otherwise uniformly distributed pressure on them, their magnitude increasing as the departure from perfect alinement of the pinion and turbine shaft increases. In the third method a solid pinion engages a flexible gear, that is to say one whose teeth yield at each point of the line of contact, proportionally to the pressure exerted on them at these different points. While this arrangement tends to equalize the tooth pressure along the line of contact, it can be shown that uniform distribution can be obtained only if the resilience is made infinite.

My invention utilizes a third driving element, viz., the idlers with means to hold said idlers in mesh with the driving element and driven element and yet to allow flexibility of contact with the driving and driven elements, automatically following the distortion or disalinement from any cause.

Referring to the construction illustrated in Fig. 4, I have here shown the idlers employed also as a speed reducing element. The gears 1 and 2 on the driven shaft 3 are arranged substantially as illustrated in Figs. 1 and 2 but the idlers 30 and 31 in mesh with the gears 1 and 2 are not driven directly with the teeth to the driving pinions, but the idler shaft 16 is extended and carries idler gears 32 and 33 of different diameter than the idlers 30 and 31 so as to afford a still further speed reducing mechanism in this form. The larger idler gears 32 and 33 are in mesh with the pinions 34 and 35 respectively of the driving element, such pinions being mounted on a shaft 36 with the coupling member 37 adapted to be driven by the turbine engine shaft. In this form I prefer to have a support 38 with bearings for the shaft 36 at a plurality of points as indicated at 39, 40, 41, and 42 giving an even and proper support for each pinion where its teeth mesh with the teeth in the idlers 32 and 33. It will be noted, in this form, that the idlers even though employed as a speed changing element also automatically conform to the alinement and torsion incident to the driving element 36 and driven shaft 3.

In Fig. 3 I have shown a type of balanced idler driving gear with still further capability for self-adjustment for each of the plurality of driving pinions and idlers. In this form the driven gears are shown in pairs, 50, 51 and 52, 53, the driving pinions are also shown in pairs 54 and 55 for the first pair of driven gears and 56 and 57 for the second pair, each set of driving pinions being independently mounted on their respective shafts 58 and 59, the shaft 58 with the driving coupling 60 serving also for driving the shaft 59 through the flexible coupling members 61 and 62. Couplings 60, 61, and 62 are so constructed as to permit limited free longitudinal motion of the shafts 58 and 59. Bearings for the shaft 58 are shown at 64, 65, and 66 carried in the frame 67 and supported in the casing 70 of the transmission casing 70. The corresponding frame 71 and bearings for the shaft 59 are provided. Thus each driving pair of pinions may be independently alined for still further flexibility and as well automatically adjusting the power of transmission for the respective sets of driven gears 50, 51 and 52, 53 through the corresponding independently adjustable sets of idlers, resulting in a more nearly mechanically perfect driving construction.

The idlers I prefer to also form in pairs this modification being herein shown as one pair 72, 73 united by a hub 75 co-operating with the pinions 54 and 55 and driven gears 50 and 51 respectively. The corresponding set of idlers 76 and 77 are united by the hub 78 and in position to mesh with the other pinions and gears. Each of these pairs of idlers are positioned for independent compensating movement, the hubs 75 and 78 respectively being mounted on spherical supports 79 and 80 and these spherical supports in turn being movably mounted on the supporting shaft 81 with a central spherical hub 82 rotatively secured in between the bearings 83 and 84 carried by the casing 70. In this manner each pair of idlers is not only independently movably supported but is balanced with regard to each other so as to automatically follow and compensate for the twisting or distortion throughout the mechanism while also permitting independent alinement for the different sections of the driving elements and the driven element. Any plurality of such related and balanced driving mechanisms, within reasonable limits, could be arranged as will be readily appreciated, each side being in balanced relation to the corresponding side and thus eliminating grinding friction at points on the line of contact where the pressure is concentrated.

In Fig. 5 I have illustrated a still further modification of flexible mounting for one of the gears, here shown for example, as a pair of gears 72, 73 on the hub 75. In this form the hub 75 is fitted with an internal lug 85 to which is secured at a plurality of points 86, 86, the flexible diaphragm 88 preferably of sheet steel. This diaphragm is supported on an arm 90 of a member corresponding to the support 81 shown in Fig. 3, the plurality of bolts 91 securing the central portion of the diaphragm 88 to a flange 92 on the end of the supporting arm 90. In this modified form it will be appreciated that the pair of gears on the hub 75 are held firmly in mesh with the driven gears while permitting said hub and its gears to automatically compensate for torsion, disalinement, wear or other distortions similar to that already explained in connection with the forms shown in Figs. 1, 3, and 4. Preferably and as herein shown in Fig. 2. I arrange the axes of the pinion, gear and idler so that the plane of the idler and pinion axes is substantially perpendicular to the plane of the idler and gear axes. It will however be appreciated that the invention is carried out provided the above planes form some angle other than 180 degrees.

My invention is further described and defined in the form of claims as follows:

1. In a reduction gearing of the kind described, a driving element, a driven element, couplings on each of said elements for connecting them to the source and outlet of power respectively, bearings for supporting said driving and said driven elements, said bearings and said couplings permitting substantially unrestricted axial motion of driving and driven elements relative to one another, an intermediate member through which said driving element actuates said driven element and means for mounting said intermediate element so that it may aline itself with and adjust itself axially to both driving and driven elements.

2. A reduction gearing of the kind described of balanced double helical tooth type, comprising a driving pinion element, a driven gear element both journaled in a rigid casing tending to prevent relative transverse motion of their axes, couplings on each of said elements for connecting them to the source and outlet of power respectively, said journals and said couplings permitting axial motion of driving and driven elements relative to one another, an intermediate idler, through which said driving element actuates said driven element, and a mounting for said idler permitting transverse angular motion of its axis in any plane passing through it and longitudinal motion of the idler along its axis, said mounting restricting the idler so that its axis passes through a fixed point in said casing.

In testimony whereof, I have signed my name to this specification, in the presence of two subscribing witnesses.

CHRISTOPHER A. SCHELLENS.

Witnesses:
JAMES R. HODDER,
RACHAEL G. LESLIE.